United States Patent
Kumar

(10) Patent No.: US 7,136,944 B2
(45) Date of Patent: Nov. 14, 2006

(54) METHOD AND APPARATUS FOR USING ADDRESS TRAPS TO PACE WRITES TO PERIPHERAL DEVICES

(75) Inventor: Sampath Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 150 days.

(21) Appl. No.: 11/003,135

(22) Filed: Dec. 2, 2004

(65) Prior Publication Data
US 2006/0123171 A1 Jun. 8, 2006

(51) Int. Cl.
*G06F 3/00* (2006.01)
(52) U.S. Cl. .................. 710/59; 710/60; 710/260; 713/401; 712/244
(58) Field of Classification Search .......... 710/59, 710/60, 260, 35, 58, 52, 61, 268; 713/401; 712/244
See application file for complete search history.

(56) References Cited

U.S. PATENT DOCUMENTS

| | | | | |
|---|---|---|---|---|
| 4,507,732 A | * | 3/1985 | Catiller et al. ............... 710/59 |
| 4,692,895 A | * | 9/1987 | Huffman ..................... 710/59 |
| 5,325,521 A | * | 6/1994 | Koyama et al. ............. 714/55 |
| 5,708,817 A | * | 1/1998 | Ng et al. .................... 710/266 |
| 6,216,217 B1 | * | 4/2001 | Seki ........................... 712/33 |
| 6,629,252 B1 | * | 9/2003 | Gholami et al. ........... 713/401 |
| 6,728,906 B1 | * | 4/2004 | Case et al. .................. 714/45 |
| 6,954,873 B1 | * | 10/2005 | Jain ........................... 713/500 |
| 2004/0193757 A1 | * | 9/2004 | Creta et al. ................. 710/33 |
| 2005/0160205 A1 | * | 7/2005 | Kuo et al. ................... 710/36 |

OTHER PUBLICATIONS

Processor Bus Fundamentals for SoC Design, PMC Sierra, Mar. 2005.*
System-on-a Chip, Wikipedia definition.*
A Clock Tuning Circuit for System-on-Chip, Elboim et al., 2002.*
Broadcom, User Manual for the BCM1250, BCM1125, and BCM1125H, Oct. 21, 2002, pp. 67-69, Broadcom Corp., Irvine, CA; downloaded from the Internet.
Broadcom cite continued: <http://sibyte.broadcom.com/public/resources/dlfile.cgi/docs/1250_1125-UM100-RDS.pdf>.

* cited by examiner

*Primary Examiner*—Khanh Dang
(74) *Attorney, Agent, or Firm*—Charles E. Krueger

(57) ABSTRACT

A system and method for pacing writes to a legacy peripheral device includes a control block configured to trap on the address of the legacy peripheral device and slows the rate that the CPU posts writes to avoid backpressure.

15 Claims, 2 Drawing Sheets

METHOD AND APPARATUS FOR USING ADDRESS TRAPS TO PACE WRITES TO PERIPHERAL DEVICES

BACKGROUND OF THE INVENTION

Incompatibility between new and existing products is a major problem in many technical disciplines, including networking and signal switching. Often new products are developed having increased performance and speed but customers have invested heavily in legacy products.

Incompatibility is a particular problem with network devices, such as routers and switches. Generally a router includes a chassis which can be rack mounted, has different types of slots into which cards and modules slide, and also contains basic components such as power supply(s) and fan(s). The modules inserted into the slots may be line cards, which are the actual printed circuit boards that handle packet data and analog signaling ingress and egress, or other types of modules.

One type of incompatibility with legacy peripheral devices occurs when the peripheral device absorbs writes at a much slower rate than the rate at which the CPU issues writes. This problem is somewhat alleviated by posted writes where the bus system provides buffers for data written by the CPU. For example, the PCI bus implements write posting in buffers located on P2P (PCI to PCI) bridges which connect PCI bus segments.

However, when the CPU rate of writing data greatly exceeds the capacity of a legacy peripheral device to accept data the write posting buffers themselves may reach their capacity and backpressure can result in system-wide problems. These problems can be difficult to detect and control when the CPU and other devices are integrated on a system-on-a-chip (SOC).

An ad hoc solution is to modify the device driver for slow legacy peripheral devices to insert wait states to match the CPU data write rate to the legacy device. However, for systems designers this solution is not viable since customers must be free to attach new devices to the network device.

The challenges in the field of providing compatibility with legacy devices continue to increase with demands for more and better techniques having greater flexibility and adaptability. Therefore, a need has arisen for a new system and method for writing to slow legacy devices.

In accordance with the present invention, a system and method for writing data to slow legacy devices without causing buffer overflow is provided that addresses disadvantages and problems associated with previously developed systems and methods.

BRIEF SUMMARY OF THE INVENTION

In one embodiment of the invention, a control block is configured so that an address trap interrupt handler, that paces the rate of writes to the legacy peripheral device, occurs when the address of a legacy peripheral device is detected.

In another embodiment of the invention, the interrupt controller time stamps its time of occurrence and slows the rate of write postings if the time between successive time stamps is less than a preset interval.

In another embodiment of the invention, the control block is configured so that the interrupt handler occurs only after the address of the legacy peripheral device is detected a selected number of times.

In another embodiment the interrupt handler slows the rate of CPU write posting by delaying the CPU by a selected interval.

Other features and advantages of the invention will be apparent from the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1:
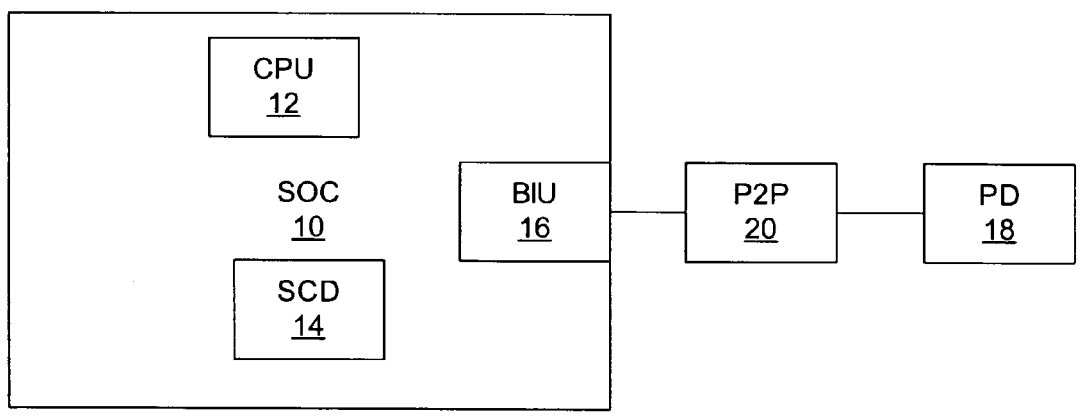
FIG. 1 is a block diagram of a system for utilizing an embodiment of the invention.

An embodiment will now be described, by way of example, not limitation, where a peripheral device is coupled to an SOC, for example the BCM1125H manufactured by Broadcom, by a bus system, such as the PCI bus. FIG. 1 depicts an SOC 10 including a CPU 12, SCD (System Control and Debugging) block 14, and a BIU (Bus Interface Unit) 16. A legacy peripheral device 18 is connected to a bus segment of the PCI bus through a P2P bridge 20 and the BIU 16.

If the legacy peripheral device 18 absorbs writes slowly its data buffers get full and a stop message is sent to the P2P bridge 20. If the legacy peripheral device 18 is very slow writes can be backed up in buffers throughout the system, including buffers in the CPU 12 itself. Thus, common system resources are consumed that can affect other devices during, for example, device to device or device to memory data transfers.

The SCD of the BCM1125H SOC allows address traps to be set for four distinct address ranges. Each address trap can be configured to discriminate between Read and Write operations and has a count parameter. Thus, an address trap can be set so that an interrupt handler occurs when a selected number of write operations with destination addresses within a selected range of addresses are detected.

Figure 2:
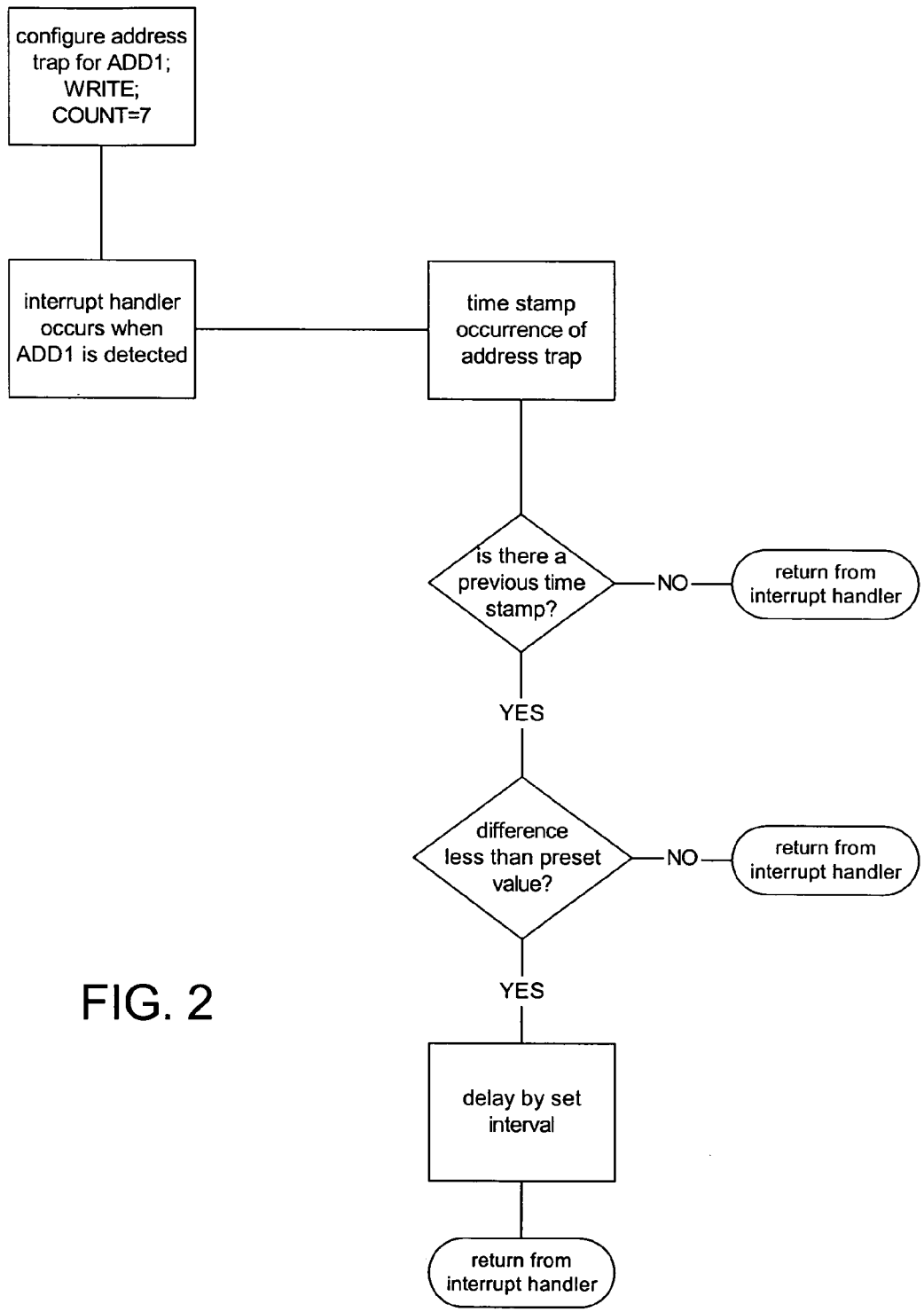
FIG. 2 is a flow chart depicting the operation of an embodiment of the invention.

The operation of an embodiment of the invention will now be described with reference to FIG. 1 and to the flow chart of FIG. 2.

This embodiment is especially useful to pace writes during the initialization of a peripheral device when the CPU may write configuration and other data to registers in the device. In many cases, the occurrence of multiple, sequential write operations to the peripheral device is unusual after device initialization.

First, an address trap is configured in the SCD block to trap on ADD1, or a range of addresses including ADD1, which is the address (or range of addresses) assigned to a slot holding the legacy peripheral device 18, the R/W parameter is set to detect only Write operations, and the count is set to the maximum value, for example the count value is 7 for a three-bit count field.

Typically, the addresses to be trapped and the interrupt handler are configured by the system designers of the network device. Thus, when users insert legacy modules into the slot the device automatically paces writes to the legacy module.

In this embodiment, the interrupt handler occurs after the $7^{th}$ occurrence of the ADD1 value is detected when the CPU is writing to the peripheral device 18. The interrupt handler time stamps the time that the address trap occurs and saves the time stamp. If no previous time stamps have occurred the interrupt handler returns and the CPU continues executing instructions.

If previous time stamps have been saved the interrupt handler determines whether the time interval between the time when the current address trap occurs and the time when an immediately address trap occurs is less that a preset time interval value.

The preset time interval value is selected so that if ADD1 is detected on the bus seven times (in this example) during the preset time interval value then a continuous series of writes is being generated an backpressure might result. The interrupt handler then delays further CPU writes to the peripheral device by a selected time interval to allow backpressure to dissipate. If the difference between the time stamps is greater that the preset value then the writes are not sequential and no backpressure will result.

For example, if the CPU executes a write instruction each 2 microseconds and if the peripheral device accepts a write in 14 microseconds then it takes the device 98 microseconds to accept 7 writes. In this case, if the time interval between time stamps were 14 microseconds then the CPU would have issued 7 write operations, however the peripheral devices would have only been able to accept one of the writes and will require 84 additional microseconds to accept the additional 6 writes that have been posted. Accordingly, the interrupt handler delays the CPU by an additional 84 microseconds so that the device would have 98 microseconds to absorb the 7 write operations. In one embodiment, the delay is implemented as a counter.

The R/W discrimination and count features described above are not necessary to practice the invention. If the interrupt handler occurred each time ADD1 was asserted the interrupt handler would occur more frequently. However, the CPU rate of execution is so fast that the delay due to executing extra instructions is insignificant when compared to the delays and latencies that occur when writing data to peripheral devices.

The invention may be implemented as program code, stored on a computer readable medium, that is executed by a digital computer. The computer readable medium may include, among other things, magnetic media, optical media, electromagnetic fields encoding digital information, and so on.

The invention has now been described with reference to the preferred embodiments. In particular, the rates at which the CPU executes writes and at which the device absorbs writes are given by way of example, not limitation. For example, the particular time intervals discussed are only to illustrate the operation of the invention. Alternatives and substitutions will now be apparent to persons of skill in the art. Accordingly, it is not intended to limit the invention except as provided by the appended claims.

What is claimed is:

1. A method for pacing writes to a peripheral device from a system including a CPU that posts writes at a high rate and a control block that causes an interrupt handler to occur when a specified address is detected, said method comprising:
    configuring the control block so that the interrupt handler occurs when a first address, being the address of a first peripheral device, is detected;
    with the interrupt handler:
    saving a time value indicating when the interrupt handler occurred; and
    slowing the rate that the CPU posts writes if the difference between the time value saved by the current occurrence of the interrupt and a previously saved time value is less than a preset time interval value thereby indicating that a series of writes to the peripheral device is occurring that could cause backpressure.

2. The method of claim 1 where the step of configuring further comprises:
    configuring the control block so that the interrupt handler occurs only after the first address has been detected a selected number of times.

3. The method of claim 1 where the step of slowing the CPU includes:
    delaying the execution of following instructions by a fixed time interval.

4. The method of claim 3 where the step of delaying includes:
    causing the CPU to count to a selected value.

5. A system for pacing writes to a peripheral device from a system including a CPU that posts writes at a high rate and a control block that causes an interrupt handler to occur when a specified address is detected, said system comprising:
    means for configuring the control block so that the interrupt handler occurs when a first address, being the address of a first peripheral device, is detected;
    with the interrupt handler including:
    means for saving a time value indicating when the interrupt handler occurred; and
    means for slowing the rate that the CPU posts writes if the difference between the time value saved by the current occurrence of the interrupt and a previously saved time value is less than a preset time interval value thereby indicating that a series of writes to the peripheral device is occurring that could cause backpressure.

6. The system of claim 5 where the means for configuring further comprises:
    means for configuring the control block so that the interrupt handler occurs only after the first address has been detected a selected number of times.

7. The system of claim 5 where the means for slowing the CPU includes:
    means for delaying the execution of following instructions by a fixed time interval.

8. The system of claim 7 where means for of delaying includes:
    means for causing the CPU to count to a selected value.

9. A computer program product, executed by a processor, for pacing writes to a peripheral device from a system including a processor that posts writes at a high rate and a control block that causes an interrupt handler to occur when a specified address is detected, said computer program product comprising:

a computer usable medium having computer readable program code physically embodied therein, said computer program product further comprising:

computer readable program code executed by the processor for configuring the control block so that the interrupt handler occurs when a first address, being the address of a first peripheral device, is detected;

with the interrupt handler comprising:

computer readable program code executed by the processor for saving a time value indicating when the interrupt handler occurred; and computer readable program code executed by the processor for slowing the rate that the processor posts writes if the difference between the time value saved by the current occurrence of the interrupt and a previously saved time value is less than a preset time interval value thereby indicating that a series of writes to the peripheral device is occurring that could cause backpressure.

10. The computer program product of claim 9 where the computer readable program code executed by the processor for configuring further comprises:

computer readable program code executed by the processor for configuring the control block so that the interrupt handler occurs only after the first address has been detected a selected number of times.

11. The computer program product of claim 9 where the computer readable program code executed by the processor for slowing the CPU includes:

computer readable program code executed by the processor for delaying the execution of following instructions by a fixed time interval.

12. The computer program product of claim 11 where the computer readable program code executed by the processor for delaying includes:

computer readable program code executed by the processor for causing the CPU to count to a selected value.

13. A method for pacing writes to a peripheral device from a system including a CPU that posts writes at a high rate and a control block, configured so that an interrupt handler occurs when a first address, being the address of a first peripheral device, is detected, said method, performed by the interrupt handler, comprising:

saving a time value indicating when the interrupt handler occurred; and slowing the rate that the CPU posts writes if the difference between the time value saved by the current occurrence of the interrupt and a previously saved time value is less than a preset time interval value thereby indicating that a series of writes to the peripheral device is occurring that could cause backpressure.

14. A system for pacing writes to a peripheral device from a system including a CPU that posts writes at a high rate and a control block, configured so that an interrupt handler occurs when a first address, being the address of a first peripheral device, is detected, said system including an interrupt handler comprising:

means for saving a time value indicating when the interrupt handler occurred; and means for slowing the rate that the CPU posts writes if the difference between the time value saved by the current occurrence of the interrupt and a previously saved time value is less than a preset time interval value thereby indicating that a series of writes to the peripheral device is occurring that could cause backpressure.

15. A system for pacing writes to a peripheral device from a system including a processor that posts writes at a high rate and a control block, configured so that the interrupt handler occurs when a first address, being the address of a first peripheral device, is detected, said system including an interrupt handler being a computer program product executed by the processor comprising:

a computer usable medium having computer readable program code physically embodied therein, said computer program product further comprising:

computer readable program code executed by the processor for saving a time value indicating when the interrupt handler occurred; and computer readable program code executed by the processor for slowing the rate that the processor posts writes if the difference between the time value saved by the current occurrence of the interrupt and a previously saved time value is less than a preset time interval value thereby indicating that a series of writes to the peripheral device is occurring that could cause backpressure.

* * * * *